(12) United States Patent
Maehara

(10) Patent No.: US 9,931,800 B2
(45) Date of Patent: *Apr. 3, 2018

(54) METHOD OF PRODUCING TIRE HAVING CIRCUMFERENTIAL REINFORCEMENT LAYER WITH AT LEAST TWO SPIRALLY WOUND STRIPS

(71) Applicant: BRIDGESTONE CORPORATION, Chuo-ku, Tokyo (JP)

(72) Inventor: Daisuke Maehara, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 364 days.

This patent is subject to a terminal disclaimer.

(21) Appl. No.: 14/797,778

(22) Filed: Jul. 13, 2015

(65) Prior Publication Data

US 2015/0336345 A1 Nov. 26, 2015

Related U.S. Application Data

(62) Division of application No. 14/273,172, filed on May 8, 2014, now Pat. No. 9,321,230.

(30) Foreign Application Priority Data

May 10, 2013 (JP) .................................. 2013-100201

(51) Int. Cl.
*B29D 30/30* (2006.01)
*B29D 30/16* (2006.01)
(Continued)

(52) U.S. Cl.
CPC ......... *B29D 30/30* (2013.01); *B29D 30/1628* (2013.01); *B29D 30/3028* (2013.01);
(Continued)

(58) Field of Classification Search
CPC . Y10T 152/10783; B60C 9/22; B60C 9/2204; B60C 2009/2209; B29D 30/1628;
(Continued)

(56) References Cited

U.S. PATENT DOCUMENTS

| 4,244,415 A | 1/1981 | Peter et al. |
| 4,869,307 A | 9/1989 | Bormann et al. |

(Continued)

FOREIGN PATENT DOCUMENTS

| EP | 0 855 289 A1 * | 7/1998 |
| FR | 2 405 148 | 5/1979 |

(Continued)

OTHER PUBLICATIONS

European Office Action dated Sep. 15, 2014 in European Application No. 14167102.4.

(Continued)

*Primary Examiner* — Adrienne C Johnstone
(74) *Attorney, Agent, or Firm* — Sughrue Mion, PLLC

(57) ABSTRACT

A tire with a circumferential reinforcement layer formed by spirally winding rubber strips in the same direction from different positions arranged in the width direction of the tire. The rubber strips (12A and 12B) are arranged with spaces in a part or the entirety of the tire in the width direction; among those end portions of the rubber strips, at least medial end portions (12Bs and 12Ae) that are located on the equatorial plane side of the tire are arranged at positions where the medial end portions completely overlap with rib-form land portions (2a) in the width direction of the tire; and the width of the rib-form land portions overlapping with the medial end portions is defined as W and the width of the rubber strips is defined as G, wherein a relationship G<W is satisfied.

1 Claim, 1 Drawing Sheet

(51) Int. Cl.
*B60C 9/22* (2006.01)
*B29D 30/70* (2006.01)
*B60C 11/00* (2006.01)
*B60C 11/04* (2006.01)

(52) U.S. Cl.
CPC ............ *B29D 30/70* (2013.01); *B60C 9/2204* (2013.01); *B60C 11/00* (2013.01); *B60C 11/04* (2013.01); *B60C 2009/2219* (2013.01); *B60C 2009/2271* (2013.01); *Y10T 152/10783* (2015.01)

(58) Field of Classification Search
CPC ............ B29D 30/1621; B29D 30/3028; B29D 30/3021
USPC .......................... 152/531, 533; 156/117, 397
See application file for complete search history.

(56) References Cited

U.S. PATENT DOCUMENTS

| | | | |
|---|---|---|---|
| 5,076,336 | A | 12/1991 | Watanabe et al. |
| 5,373,885 | A | 12/1994 | Yamashita |
| 5,379,818 | A | 1/1995 | Suzuki et al. |
| 5,396,941 | A | 3/1995 | Iuchi |
| 5,400,847 | A | 3/1995 | Suzuki et al. |
| 5,931,211 | A | 8/1999 | Tamura |
| 2002/0026979 | A1 | 3/2002 | Tanaka |
| 2005/0022917 | A1 | 2/2005 | Valentine et al. |
| 2013/0025756 | A1 | 1/2013 | Hashimoto |
| 2013/0284337 | A1 | 10/2013 | Croissant |

FOREIGN PATENT DOCUMENTS

| | | |
|---|---|---|
| JP | H02106409 | 4/1990 |
| JP | H04201553 | 7/1992 |
| JP | H05254309 | 10/1993 |
| JP | H08192605 | 7/1996 |
| JP | 10-193917 A | 7/1998 |
| JP | 2783834 B2 | 8/1998 |
| JP | H11115413 | 4/1999 |
| JP | 2001322405 | 11/2001 |
| JP | 2004189156 | 7/2004 |
| JP | 2005247069 | 9/2005 |
| JP | 2005247070 | 9/2005 |
| JP | 2006130942 | 5/2006 |
| JP | 2007-069408 | 3/2007 |
| JP | 2008-087608 | 4/2008 |
| JP | 2013-28070 | 2/2013 |

OTHER PUBLICATIONS

International Search Report dated Jun. 3, 2014 in PCT/JP2014/061679.
Patent Prosecution Highway Request Preliminary Amendment filed Aug. 25, 2014 in U.S. Appl. No. 14/273,172.
A Notice of Allowance dated Jan. 7, 2016 in U.S. Appl. No. 14/273,172.
An Amendment Under 37 C.F.R. § 1.116 filed Dec. 14, 2015 in U.S. Appl. No. 14/273,172.
An Amendment Under 37 C.F.R. § 1.111 filed Sep. 3, 2015 in U.S. Appl. No. 14/273,172.
An Office Action dated Sep. 18, 2015, which issued during the prosecution of U.S. Appl. No. 14/273,172.
An Office Action dated Jun. 5, 2015, which issued during the prosecution of U.S. Appl. No. 14/273,172.
A Response to Restriction Requirement filed May 18, 2015 in U.S. Appl. No. 14/273,172.
A Restriction Requirement dated Mar. 18, 2015, which issued during the prosecution of U.S. Appl. No. 14/273,172.

* cited by examiner

[Fig. 1]
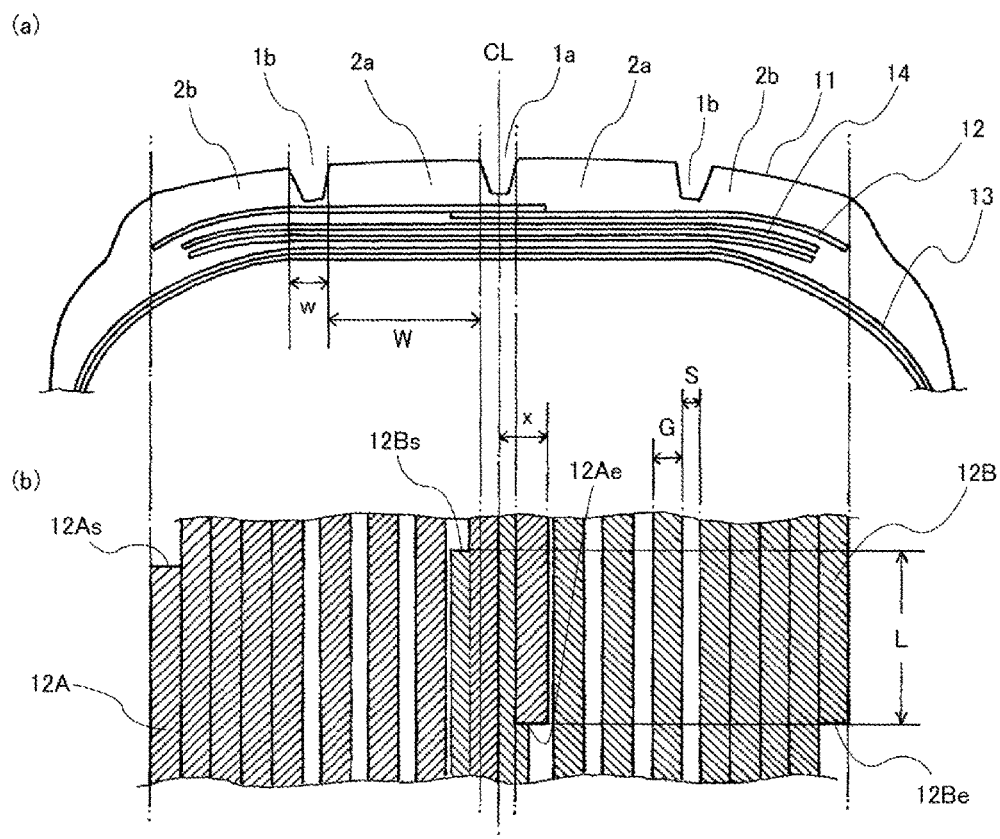
[Fig. 2]
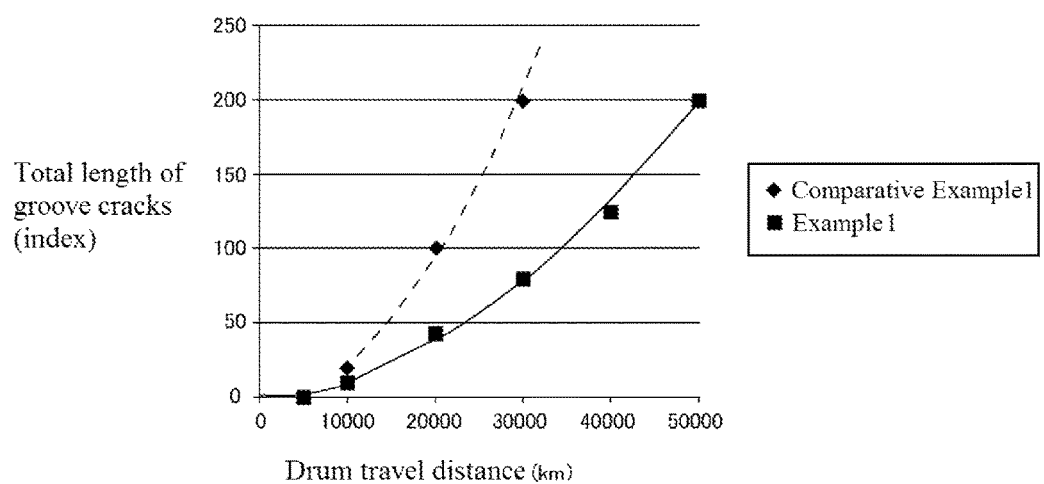

METHOD OF PRODUCING TIRE HAVING CIRCUMFERENTIAL REINFORCEMENT LAYER WITH AT LEAST TWO SPIRALLY WOUND STRIPS

TECHNICAL FIELD

The present invention relates to a tire and a method of producing the same. More particularly, the present invention relates to: an improvement in a tire which comprises a circumferential reinforcement layer formed by spirally winding rubber strips composed of rubber-coated cords, wherein the cords are arranged substantially in the circumferential direction of the tire, i.e. the circumferential direction ±5°; and an improvement in a method of producing the tire.

BACKGROUND ART

For example, in order to prevent a tire from inflating by the centrifugal force resulted from rotation during travelling, a technology in which a belt strip formed by parallelly arranging a plurality of reinforcing cords at appropriate intervals and embedding the cords in rubber is spirally wound to form a circumferential reinforcement layer in the crown portion of a tire, in which circumferential reinforcement layer the cords are arranged substantially in the circumferential direction of the tire, has been widely used. In this circumferential reinforcement layer, from the standpoint of weight reduction, the belt strip may be wound with spaces in the tire width direction (see, for example, Patent Document 1).

RELATED ART DOCUMENT

Patent Document

Patent Document 1: Japanese Unexamined Patent Application Publication No. H10-193917 (Claims, etc.)

SUMMARY OF THE INVENTION

Problems to be Solved by the Invention

A belt strip is a material which is spirally wound in the circumferential direction of a tire to form a circumferential reinforcement layer; therefore, such a belt strip always has end portions at the positions where winding thereof is initiated and terminated. This belt strip is structurally free-ended in the vicinity of the end portions and thus cannot sufficiently exhibit tensile rigidity and, as a result, the belt strip is largely distorted locally.

From the standpoint of production efficiency, there are cases where a method in which a belt strip-unwinding means is arranged at two positions to simultaneously wind two independent belt strips at different positions of a tire and to thereby arrange the belt strips in the entire region of interest is employed. This method allows a tire to be produced more efficiently as compared to a case where a belt strip is wound at one position and the time and cost of production can thus be reduced; however, since the end portions of the two independent belt strips are placed in the vicinity of the equatorial plane of the resulting tire, when these end portions overlap with a center main groove, the above-described generation of local distortion in the vicinity of the end portions causes groove cracking to be accelerated. When groove cracking occurs, the outer appearance and aesthetic design of the tire are markedly deteriorated. In addition, if such groove cracking is left as is, due to the progress of cracking, for example, water may infiltrate into the tire through the cracks formed on the groove bottom and this may lead to corrosion of reinforcing materials such as a belt. Furthermore, in cases where a circumferential reinforcement layer is formed by winding belt strips with spaces in the tire width direction, since the total number of winding is reduced, the tension exerted on the belt strips at the respective winding positions is increased as compared a case where the belt strips are wound without any space, so that reduction in the rigidity at the end portions of the belt strips is increased and generation of local distortion becomes even more conspicuous. Therefore, in cases where two independent belt strips are employed and these belt strips are arranged at appropriate intervals in the tire width direction, depending on how the end portions of the belt strips are arranged, generation of groove cracking may potentially be promoted.

In view of the above, an object of the present invention is to provide a technology for reducing the occurrence frequency of groove cracking in all of the tires which comprise such a spirally-wound circumferential reinforcement layer as described above.

Means for Solving the Problems

The tire according to the present invention is a tire comprising, a tread portion provided with three or more circumferential grooves and rib-form land portions defined by the circumferential grooves; and a circumferential reinforcement layer formed by spirally winding two independent rubber strips in the same direction from different positions arranged in the width direction of the tire, which rubber strips are composed of a plurality of parallel cords and covered with rubber. The above-described rubber strips are arranged with spaces in a part or the entirety of the tire in the width direction. Among those end portions located at positions where winding of the above-described two rubber strips is initiated or terminated, at least medial end portions located on the equatorial plane side of the tire are arranged at positions where the medial end portions completely overlap with the above-described rib-form land portions in the width direction of the tire. When, along the width direction of the tire, the width of the above-described rib-form land portions overlapping with the above-described medial end portions is defined as W (mm) and the width of the above-described rubber strips is defined as G (mm), a relationship G<W is satisfied.

The method of producing a tire according to the present invention is a method of producing a tire comprising a tread portion provided with three or more circumferential grooves and rib-form land portions defined by the circumferential grooves, the method comprising the step of forming a circumferential reinforcement layer by unwinding two independent rubber strips from two unwinding means arranged at different positions in the width direction of the tire, which rubber strips are composed of a plurality of parallel cords and covered with rubber, and then spirally winding the two independent rubber strips on the peripheral surface of a molding drum in the same direction, wherein the above-described rubber strips are wound with spaces in a part or the entirety of the tire in the width direction; among those end portions located at positions where winding of the above-described two rubber strips is initiated or terminated, at least medial end portions located on the equatorial plane side of the tire are arranged at positions where the medial end portions completely overlap with the above-described rib-form land portions in the width direction of the tire; and when, along the width direction of the tire, the width of the above-described rib-form land portions overlapping with the above-described medial end portions is defined as W (mm) and the width of the above-described rubber strips is defined as G (mm), the values of W and G are set such that a relationship G<W is satisfied.

Effects of the Invention

According to the present invention, by adapting the above-described constitution, the occurrence frequency of groove cracking can be largely reduced in a tire comprising a circumferential reinforcement layer.

BRIEF DESCRIPTION OF THE DRAWINGS

FIG. 1 is an illustration showing (a) a partial cross-section of one example of the tire according to the present invention in the width direction, and (b) an illustration showing the constitution of a reinforcement layer of the tire.

FIG. 2 is a graph showing the conditions of groove crack generation determined in drum tests of degraded sample tires of Example 1 and Comparative Example 1.

MODE FOR CARRYING OUT THE INVENTION

Embodiments of the present invention will now be described in detail referring to the drawings.

FIG. 1(a) is a partial cross-sectional view showing one example of the tire according to the present invention in the width direction. As shown in FIG. 1(a), the tire of the present invention comprises three circumferential grooves 1a and 1b and rib-form land portions 2a and 2b in a tread portion 11. Here, in the present invention, the term "circumferential groove" means a continuous groove running in the tire circumferential direction which has a width of about 4 to 18 mm and a depth of about 6 to 10 mm, although these values are variable depending on the total width of the tire. Generally, in accordance with the tire tread width, not less than three, usually 2 to 4 or so of such circumferential grooves are arranged on the tire. By arranging such circumferential grooves, occurrence of hydroplaning phenomenon is inhibited. Particularly, in those tires for small passenger cars, three circumferential grooves are often arranged symmetrically about the tire equator line and, in such cases, a medial circumferential groove (center main groove) is usually arranged on the tire equatorial plane. The above-described groove shrinking in wiping deformation is generally known to be the largest in the tire equatorial plane; therefore, it can be said that such a medial circumferential groove has a potential cause that most likely leads to groove crack generation. Further, in the present invention, the term "rib-form land portion" means a land portion sandwiched between the above-described circumferential grooves. Each rib-form land portion is circumferentially continuous and connects two of the circumferential grooves. In this rib-form land portion, in many cases, in order to optimize the water flow of hydroplaning and gain traction on sand or ice and snow, a plurality of lateral grooves are arranged extending over a part or the entirety of tire in the width direction.

In the present invention, a circumferential reinforcement layer 12 is formed by unwinding two independent rubber strips 12A and 12B, which are composed of a plurality of parallel cords and covered with rubber, from two unwinding means arranged at different positions in the tire width direction, and then spirally winding these rubber strips on the peripheral surface of a molding drum in the same direction. In the present invention, the rubbers strips 12A and 12B are wound with spaces on a part of or the entire tire in the width direction. That is, in the present invention, at least a part of the tire in the width direction has spaces where no rubber strip is wound. Further, on those parts having no such space, the rubber strips are each wound adjacently without any overlap. For example, in the example shown in the drawing, the rubber strips 12A and 12B are wound without any space in those regions overlapping with the shoulder-side rib-form land portions 2b, but with spaces at regular intervals in other regions. It is noted here that, in the present invention, "the peripheral surface of a molding drum" on which the circumferential reinforcement layer 12 is formed normally refers to the peripheral surfaces of a carcass layer 13 and steel belt 14, which are sequentially laminated on a molding drum as tire-constituting members. Further, in FIG. 1, for simplification, the circumferential reinforcement layer 12 is drawn continuously in the tire width direction and the direction of the winding is from left to right.

In the present invention, among those end portions 12As, 12Ae, 12Bs and 12Be that are located at positions where winding of the rubber strips 12A and 12B is initiated or terminated, at least two medial end portions located on the equatorial plane side of the tire, 12Ae and 12Bs, are arranged at positions where the respective end portions completely overlap with the rib-form land portion 2a in the tire width direction. Here, in the present invention, arranging a rubber strip end at a position where it completely overlaps with a rib-form land portion means that, for the entirety of the tire in the width direction, no rubber strip end exists in a region overlapping with the widest part of the opening of a circumferential groove. Further, in the present invention, when, along the tire width direction, the width of the rib-form land portion 2a overlapping with the above-described medial end 12Ae or 12Bs is defined as W (mm) and the width of the rubber strips 12A and 12B is defined as G (mm), the values of G and W are set such that a relationship G<W is satisfied. By this, the expected effects of the present invention can be attained for the reasons described below.

In cases where two positions of winding a rubber strip are arranged, the wound end portions of the respective rubber strips are arranged medially to at least the shoulder-side circumferential groove 1b and it is often highly probable that they are positioned on the tire equatorial plane CL. The present inventor intensively studied to discover that, if such end portions are positioned below a circumferential groove, reduction in the circumferential rigidity is initiated at these end portions, distortion of the tire is thus increased in the circumferential direction and, due to this increased distortion, groove cracking becomes more likely to occur and grow. This is particularly conspicuous in the central region of the tire in the width direction where distortion is likely to occur during travelling due to wiping, especially when a circumferential groove and a wound end portion both exist on the tire equator line. Moreover, as described above, this tendency is particularly strong in the circumferential reinforcement layer in which rubber strips are wound with spaces, because the tension exerted on the rubber strips is greater than a case where the rubber strips are wound without any space. In the present invention, at least the medial end portions 12Ae and 12Bs of the rubber strips, which are located in the central region of the tire in the width direction, are arranged in the regions overlapping with the rib-form land portion 2a, and the central region of the tire in the width direction is thereby made free of any rubber strip end portion below the circumferential groove; therefore, the effects of excessive distortion caused by reduction in the rigidity of the rubber strip end portions can be avoided and occurrence of groove cracking caused by the circumferential reinforcement layer formed by the rubber strips can be inhibited. In the present invention, all of the end portions of the rubber strips may be arranged in the regions overlapping the rib-form land portion.

Further, even when the medial end portions are arranged below a rib-form land portion, if the space between the wound rubber strips, S, or the width of the rubber strips, G, is larger than the width of the rib-form land portion, W, since the circumferential rigidity of the entire rib-form land portion under which the medial end portions are arranged is reduced, distortion of the grooves adjacent to the rib-form land portion is increased during travelling and this causes groove cracking to occur. Therefore, in the present invention, by positioning the medial end portions below the rib-form land portions such that the values of G and W are set to satisfy a relationship G<W, generation of distortion can be inhibited and weight reduction can also be achieved without reducing the durability against groove cracking.

Moreover, the medial end portions 12Bs and 12Ae of the two rubber strips 12A and 12B are arranged closely to each other in the vicinity of the tire equatorial plane; however, if these end portions are excessively close to each other, since one end portion is affected by the other, groove cracking may be largely aggravated. In contrast, in the present invention, by positioning the medial end portions of the two rubber strips in such a manner that they are displaced from each other in the tire circumferential direction, the effects exerted by the respective end portions can be mitigated and aggravation of groove cracking can thus be inhibited. In the present invention, specifically, it is preferred that the distance between the medial end portions 12Bs and 12Ae of the two rubber strips in the tire circumferential direction, L, be 100 to 400 mm. When the distance L between the medial end portions of the two rubber strips is less than 100 mm, the end portions are too close to each other, so that the growth of groove cracks is accelerated and prominent groove crack-inhibiting effect is thus not likely to be exhibited. Meanwhile, when the distance L between the medial end portions of the two rubber strips is greater than 400 mm, since the rigidity of the regions having an increased number of winding the respective two rubber strips in the tire circumferential direction is relatively increased, the ground-contact pressure of the land portions adjacent to the medial circumferential groove 1a becomes uneven and this causes early uneven wearing of the tire, which is not preferred. Here, the distance L between the medial end portions of the two rubber strips in the tire circumferential direction means a distance which is measured between the medial end portions of the rubber strips along the tire circumferential direction, regardless of the positions of the medial end portions of the rubber strips in the tire width direction.

In the present invention, as shown in the drawing, it is preferred that the medial end portions 12Ae and 12Bs of the two rubber strips 12A and 12B be arranged overlapping each other also in the tire radial direction. By this arrangement, since the end portions of the rubber strips where distortion is likely to occur are held pressed by other rubber strips having no end, the groove crack-inhibiting effect can be further improved. Here, the expression "the medial end portions of the rubber strips are arranged overlapping each other in the tire radial direction" means that the end portions of the rubber strips at the positions on the side of the tire equatorial plane where winding of the respective rubber strips is terminated have an overlapping part in the tire radial direction.

Further, in the present invention, it is preferred that, of the circumferential grooves 1a and 1b, at least at a position existing on the tire equatorial plane or at a position overlapping with the medial circumferential groove 1a which is closest to the tire equatorial plane, the two rubber strips 12A and 12B overlapping in the tire radial direction be each wound in the tire width direction across a region overlapping with the medial circumferential groove 1a such that there is substantially no space between the wound rubber strips 12A and 12B in the region overlapping with the medial circumferential groove 1a. That is, by winding the adjacent rubber strips in such a manner that they are displaced from each other in the tire width direction, at least at a position overlapping with the medial circumferential groove 1a which exists in the vicinity of the tire equatorial plane, as shown in FIG. 1, the circumferential reinforcement layer is arranged with substantially no space. By this arrangement, the groove crack-inhibiting effect can be further improved. When a space remains at a position overlapping with the circumferential reinforcement layer, due to tread deformation such as wiping or the like, the bottoms of the grooves are also likely to be deformed. Here, in cases where a circumferential groove exists on the tire equatorial plane as shown in the drawing, since the distortion caused by wiping is particularly large, it can be said that the effects of the present invention are prominently exhibited in such cases.

Still further, in the present invention, when the space between rubber strips that are wound in the tire width direction is defined as S (mm), it is preferred that the width of the rubber strip, G, and the space of the rubber strip, S, satisfy a relationship G>S. When the space between rubber strips, S, is larger than the width of the rubber strip, G, distortion is likely to occur in this portion, causing groove cracking and the like. By controlling the space between rubber strips, S, to be smaller than the width of the rubber strip, G, an appropriate rigidity can be ensured.

In the present invention, as a specific mode of winding the rubber strips, in addition to a mode in which, as shown in FIG. 1, the respective end portions of two rubber strips are arranged overlapping with the rib-form land portion 2a adjacent to the medial circumferential groove 1a such that the end portions of the two rubber strips are not located in the medial circumferential groove 1a and both of the two independent rubber strips are wound in the positions overlapping with the medial circumferential groove 1a, a mode in which the end portions of two rubber strips are arranged in the rib-form land portion 2a adjacent to the medial circumferential groove 1a such that the end portions of the two rubber strips are not located in the medial circumferential groove 1a and no rubber strip is wound in the position overlapping with the medial circumferential groove 1a can be employed. Here, the rigidity-reducing effect of the rubber strip end portions can be avoided in the same manner in both of these modes and these modes can be expected to provide substantially the same effect for inhibition of groove cracking; however, since the former mode is overwhelmingly superior in terms of protection of the medial circumferential groove 1a against penetration by a nail or the like, the former mode is more advantageous in the market of tires that are likely to be punctured. Moreover, for example, in the embodiment shown in FIG. 1, the two rubber strips may also each be folded back in the shoulder side and overlapped in the vicinity of the shoulder-side rib-form land portion 2b and, by this arrangement, the durability at high speed can be further improved. In this case as well, by arranging the end portions of the folded rubber strips in the rib-form land portion 2b but in neither of the medial circumferential groove 1a and the shoulder-side circumferential groove 1b, a structure that is strong against groove cracking is provided. In the present invention, there is no particular restriction on the range in the tire width direction where the rubber strips are wound; however, as shown in the drawing, the rubber strips are preferably wound in a range wider than the width of the steel belt 14 such that the rubber strips cover the entire width of the steel belt 14.

In the production method of the present invention, satisfaction of the above-described conditions is one important point and other points can be carried out as appropriate in accordance with a conventional method without any particular restriction. For example, with regard to the rubber strip end portions 12As and 12Be that are arranged in the position overlapping with the shoulder-side rib-form land portion 2b, in order to mitigate the effects exerted by the rubber strip end portions, a technique of further winding a rubber strip thereon one more time is often employed. In addition, there are also cases where rubber strips are wound once without any space on the entirety of a region where a circumferential reinforcement layer is to be arranged and the rubber strip is subsequently further wound thereon partially with spaces as shown in FIG. 1. In the present invention, any of these winding techniques can also be performed without any restriction. The width of the rubber strips used in the present invention, G, is not particularly restricted and it can be set as appropriate in accordance with the tire size as well as the number and the like of the rubber strips used in the tire production. For example, in cases where two unwinding means are used at two positions, from the standpoint of the balance between the performance and the productivity, it is preferred that the width of the rubber strips, G, be in the range of 4 to 7 mm. Furthermore, from the standpoint of achieving weight reduction, ensuring the performance and inhibiting intrusion of air into gaps, it is effective to set the space between the wound rubber strips, S, in the range of 30 to 70% with respect to the width of the respective rubber strips.

So far, the present invention was described with regard to a case where a tire is produced by using two unwinding means arranged at different positions and applying two independent rubber strips, which is most preferable from the standpoint of the productivity of the existing production facilities. However, in the present invention, even when the number of unwinding means is increased and a plurality (e.g., 2 to 4) of independent rubber strips are applied, the same effect can be attained. That is, in the present invention, by adapting a constitution having no end portion of the circumferential reinforcement layer under the circumferential groove and adjusting the amount of the end portions of the rubber strips overlapping in the circumferential direction to be in the above-described appropriate range, the resulting tire can be allowed to sufficiently exhibit a desired groove crack-inhibiting effect. In this respect, there is absolutely no restriction. For example, even when the main materials of the plural rubber strips are different from one another, sufficient groove crack-inhibiting effect can be attained.

Further, in the production method of the present invention, the production efficiency can be improved by simultaneously winding two independent rubber strips using two unwinding means; however, even when a plurality of independent rubber strips are sequentially wound using a single unwinding means, by adapting a constitution having no end portion of the circumferential reinforcement layer under the circumferential groove and adjusting the amount of the end portions of the rubber strips overlapping in the circumferential direction to be in the above-described appropriate range, the resulting tire can be allowed to sufficiently exhibit a desired groove crack-inhibiting effect. In this respect as well, there is absolutely no restriction. As described above, for example, even when the main materials of the plural rubber strips are different from one another, sufficient groove crack-inhibiting effect can be attained.

The tire of the present invention can be produced by the above-described production method of the present invention. Since the tire of the present invention has a structure in which no end portion of the circumferential reinforcement layer is arranged below the circumferential groove, as compared to conventional tires, groove cracking is less likely to occur. The specific structure of the tire of the present invention is not particularly restricted, except that the tire comprises, in a tread portion, three or more circumferential grooves and a circumferential reinforcement layer formed by rubber strips that are spirally wound. Specifically, for example, the tire has, as a skeleton, a carcass layer comprising one or more carcass ply 13 that are formed by embedding a plurality of parallelly arranged reinforcing cords in a coating rubber. Such a carcass layer usually extends toroidally between a pair of right and left bead portions and is curled up and fixed around bead cores embedded in each bead portion.

On the outer side of the carcass layer 13, at least one layer of steel belt 14, which is preferably cross-arranged in two layers, and one layer of circumferential reinforcement layer 12 are sequentially arranged from the inner side in the tire radial direction. By arranging the circumferential reinforcement layer 12 exteriorly to the steel belt 14, the hoop effect during rotation can be improved and effects of improving a wide variety of performances, such as high-speed durability, driving stability and sound/vibration characteristics, can be attained. Here, in the present invention, the region in the tire width direction where the circumferential reinforcement layer 12 is arranged is not particularly restricted; however, as shown in the drawing, the circumferential reinforcement layer 12 is preferably arranged in a range wider than the width of the steel belt 14 such that the circumferential reinforcement layer 12 covers the entire width of the steel belt 14. As the cords constituting the circumferential reinforcement layer, a general-purpose organic fiber such as nylon can be used. However, particularly when a high-rigidity material, such as polyethylene naphthalate (PEN), polyethylene terephthalate (PET), aramid or a hybrid cord containing these materials, is employed, since reduction in the rigidity of the end portions of the rubber strips is increased as compared to a case where a low-rigidity material is used, the effect exerted by not positioning any end portion of the rubber strips below the circumferential grooves is increased and this makes application of the present invention more useful. In addition, by using the above-described high-rigidity fibers, such effects that the amount of flat spots can be reduced and the increase in the rigidity can be linked with reduction in the amount of cords to be used are attained, so that a superior tire can be provided.

EXAMPLES

The present invention will now be described in more detail by way of examples thereof.

Example 1

At a tire size of 205/55R16, a passenger car tire comprising, as shown in FIG. 1, three circumferential grooves (groove width, w=6 mm) and rib-form land portions defined by the circumferential grooves in a tread portion was produced. Using a production equipment comprising two winding heads arranged at different positions in the tire width direction, two rubber strips, each of which were composed of six parallel nylon cords and covered with rubber (width, G=6 mm), were simultaneously unwound from the two heads and then spirally wound in the same direction on the peripheral surface of a molding drum, thereby forming a circumferential reinforcement layer. The winding of the rubber strips was performed with 4 mm spaces, s, in the central region of the tire width direction. In the outer region of 30 mm in width, the rubber strips were wound without any space. In this Example 1, among those end portions of the two rubber strips at the respective positions of starting or terminating the winding process, as shown in FIG. 1, the medial end portions 12Bs and 12Ae were arranged in the respective regions completely overlapping with different rib-form land portions 2a (width, W=24 mm) in the width direction, with their outer edges in the tire width direction being positioned substantially symmetrically about the tire equatorial plane at a distance from the tire equatorial plane in the tire width direction, x, of 9 mm. In addition, the medial end portions of the two rubber strips were overlapping in the tire radial direction and, in the region overlapping with the medial circumferential groove (central main groove) 1a, the space of winding the respective rubber strips, S, was substantially 0. Moreover, the distance between the medial end portions 12Bs and 12Ae of the two rubber strips in the tire circumferential direction, L, was 250 mm.

Comparative Example 1

A circumferential reinforcement layer was formed and a sample tire of Comparative Example 1 was produced in the same manner as in Example 1, except that, among those end portions of the two rubber strips at the respective positions of starting or terminating the winding process, the medial end portions 12Bs and 12Ae were entirely arranged in the region completely overlapping with the center main groove 1a in the tire width direction, with their outer edges in the tire width direction being positioned substantially symmetrically about the tire equatorial plane at a distance from the tire equatorial plane in the tire width direction, x, of 3 mm.

<Drum Test of Degraded Sample Tires>

The sample tires produced in Example 1 and Comparative Example 1 were degraded and then subjected to a drum test in accordance with the below-described procedure and the condition of groove crack generation was evaluated for the changed positions of the rubber strip end portions. The results thereof are shown in the graph of FIG. 2. First, the sample tires were degraded by leaving them to stand for 8 weeks in an 80° C. thermostat stock room under $O_2$-loaded condition. Then, the sample tires were each installed on a rim of 6.5 J in size and subsequently subjected to a drum test at an inner pressure of 230 kPa, a load of 615 kgf, a speed of 60 km/h and a travel distance of 50,000 km. The sample tires were evaluated by measuring the lengths of the cracks generated inside the center main groove for one circumference of each sample tire at the respective travel distances and the sum of the measured lengths was calculated. The evaluation of each sample tire was indicated as an index, taking the total length of all cracks measured on the sample tire of Comparative Example 1 at a travel distance of 20,000 km as 100. The smaller the value, the more was groove cracking inhibited.

From the results shown in the graph of FIG. 2, it was confirmed that, in the sample tire of Comparative Example 1 in which the end portions of the rubber strips were positioned under the center main groove, as compared to the sample tire of Example 1 in which the end portions of the rubber strips were arranged under the rib-form land portions to avoid the center main groove, cracking occurred in the immediate vicinity of the end portions of the rubber strips at a much earlier stage. Once a crack is generated, the crack rapidly extends from this point in the tire circumferential direction; therefore, in Comparative Example 1, groove cracking occurred relatively early. This is believed to be because, in addition to cross-sectional distortion caused by wiping deformation, which had been revealed in the previous findings, distortion in the tire circumferential direction was also generated due to the rigidity difference of the rubber strips, so that an initial groove crack occurred and extended at an early stage due to repeated deformation caused by tire rotation. In contrast, in the sample tire of Example 1, since distortion is generated primarily due to cross-sectional wiping deformation, a specific initial crack occurs and the whole rubber of the groove bottom is uniformly and slowly damaged; therefore, it is seen that this resulted in the nearly two times difference in the crack length at the same travel distance.

From the above-described results, it was found that not only cross-sectional distortion caused by wiping deformation, which had been previously revealed, but also deformation in the tire circumferential direction which shows a maximum value primarily at the ground-contacting edges (leading edge and trailing edge) contribute to deformation that causes groove cracking; and that, particularly in a case of a tire having a structure in which the end portions of rubber strips are arranged in the center main groove, both of these factors for deformation are combined to cause initial cracking to occur in a relatively short period and this serves as a nucleus for extension of cracks over the entire medial circumferential groove at an early stage. On the other hand, by winding the rubber strips such that their end portions are not arranged in the center main groove, the effects of excessive distortion caused by reduction in the rigidity of the end portions of the rubber strips can be avoided and groove cracking can thus be markedly inhibited.

Examples 2 to 4, Comparative Examples 2 and 3

A circumferential reinforcement layer was formed and sample tires of Examples 2 to 4 and Comparative Examples 2 and 3 were each produced in the same manner as in Example 1, except that the distance between the medial end portions in the tire circumferential direction, L, and the distance in the tire width direction between the outer edges of the medial end portions of the two rubber strips and the tire equatorial plane, x, were changed.

The thus obtained sample tires were degraded and subjected to a drum test in the same manner as described above and the extent of groove crack generation was verified for each sample tire at a travel distance of 20,000 km. The sample tires were evaluated by measuring the lengths of the cracks generated inside the medial circumferential grooves for one circumference of each sample tire and the evaluation of each sample tire was indicated as an index, taking the total length of all cracks measured on the sample tire of Comparative Example 1 as 100. The smaller the value, the more was groove cracking inhibited. In addition, at the same time, the extent of uneven wearing of the rib-form land portions adjacent to the medial circumferential groove was also evaluated. In this evaluation, the depth of the medial circumferential groove was measured at 16 points on the circumference to determine the P-P value, and the evaluation of each sample tire was indicated as an index, taking the P-P value of the sample tire of Comparative Example 1 as 100. The smaller the P-P value, the lower is the tendency of uneven wearing. The results of these evaluations are summarized in the table below.

TABLE 1

| | Comparative Example 1 | Example 1 | Example 2 | Example 3 | Comparative Example 2 | Example 4 | Comparative Example 3 |
|---|---|---|---|---|---|---|---|
| Position of medial end portion of rubber strip, X (mm) | 3 | 9 | 9 | 9 | 6 | 9 | 9 |
| Distance between medial end portions in the tire circumferential direction, L (mm) | 250 | 250 | 0 | 500 | 250 | 100 | 250 |
| G/W | 0.25 | 0.25 | 0.25 | 0.25 | 0.25 | 0.25 | 1.0 |
| Presence or absence of overlap of strip ends in the tire radial direction*[1] | present | present | present | present | present | absent | present |
| G/S | 1.5 | 1.5 | 1.5 | 1.5 | 1.5 | 1.5 | 1.5 |
| Groove cracking (index) | 100 | 43 | 55 | 56 | 96 | 63 | 98 |
| Resistance to uneven wearing (index) | 100 | 100 | 112 | 115 | 100 | 126 | 100 |

*[1] This indicates the presence or absence of overlapping medial end portions of the rubber strips in the tire radial direction.

As shown in the table above, in the sample tires of those Examples in which the end portions of the rubber strips were arranged in the region overlapping with the rib-form land portion to avoid the circumferential groove and the width of the rib-form land portions W and the width of the rubber strips G were set such that a relationship G<W was satisfied, it was confirmed that good resistance to uneven wearing was maintained and, at the same time, generation of groove cracking was effectively inhibited.

DESCRIPTION OF SYMBOLS 1a, 1b: circumferential groove
2a, 2b: rib-form land portion
11: tread portion
12: circumferential reinforcement layer
12A, 12B: rubber strip
12As, 12Ae, 12Bs, 12Be: end portion of rubber strip
13: carcass ply
14: steel belt

The invention claimed is:

1. A method of producing a tire provided with a tread portion having three or more circumferential grooves and rib-form land portions defined by said circumferential grooves such that each rib-form land portion is circumferentially continuous and connects two of the circumferential grooves, said method comprising:

forming a circumferential reinforcement layer by unwinding at least two independent rubber strips from different positions in the width direction of the peripheral surface of a molding drum, and then spirally winding said at least two independent rubber strips from different positions in the width direction on the peripheral surface of the molding drum, said rubber strips comprising a plurality of parallel cords covered with rubber such that the parallel cords are arranged in the circumferential direction of the molding drum ±5°, arranging said rubber strips with spaces between adjacent turns in a part or the entirety of said circumferential reinforcement layer in the width direction of the peripheral surface of the molding drum; and providing the tread portion and optionally at least one other tire-constituting member so as to produce the tire comprising the tread portion and the circumferential reinforcement layer, wherein at end portions of said rubber strips at positions where winding of said rubber strips is initiated or terminated, the arranging step comprises arranging at least medial end portions of the rubber strips located on the equatorial plane side of said tire at positions where said medial end portions completely overlap with one or more of said rib-form land portions in the width direction of said tire;

the width of said rib-form land portions overlapping with said medial end portions is defined as W in mm, the width of said rubber strips is defined as G in mm, and a relationship G<W is satisfied, and said medial end portions of said rubber strips are arranged such that they each overlap with a different rib-form land portion.

* * * * *